A. H. WOOD & O. A. FRICK.
W. W. WOOD, ADMINISTRATOR OF A. H. WOOD, DEC'D.
AXLE AND CAP STRIP UNITING MEANS.
APPLICATION FILED MAR. 21, 1913.

1,096,281.

Patented May 12, 1914.

WITNESSES:
C. H. Bills.
F. C. Aul.

INVENTORS.
Alonzo H. Wood,
Orlando A. Frick,
By Owen & Owen,
His attys.

COLUMBIA PLANOGRAPH CO., WASHINGTON, D. C.

UNITED STATES PATENT OFFICE.

ALONZO H. WOOD AND ORLANDO A. FRICK, OF DEFIANCE, OHIO; W. WEBB WOOD, ADMINISTRATOR OF SAID ALONZO H. WOOD, DECEASED, ASSIGNOR TO SAID ORLANDO A. FRICK.

AXLE AND CAP-STRIP UNITING MEANS.

1,096,281. Specification of Letters Patent. Patented May 12, 1914.

Application filed March 21, 1913. Serial No. 755,913.

*To all whom it may concern:*

Be it known that we, ALONZO H. WOOD and ORLANDO A. FRICK, citizens of the United States, and residents of Defiance, in the county of Defiance and State of Ohio, have invented a certain new and useful Axle and Cap-Strip Uniting Means; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to wagon and carriage construction, and has for its object the provision of means for reducing to a minimum the frictional resistance between the axle spindles and hub boxing and which presents a greater lubricating surface than has heretofore been provided, whereby to enhance the efficiency and commercial value thereof.

A further object of the invention is the provision of improved means for centering the cap-strip on an axle, and also securely holding it thereto.

The invention is fully described in the following specification, and while, in its broader aspect, it is capable of embodiment in numerous forms, a preferred embodiment thereof is illustrated in the accompanying drawings, in which,—

Figure 1:
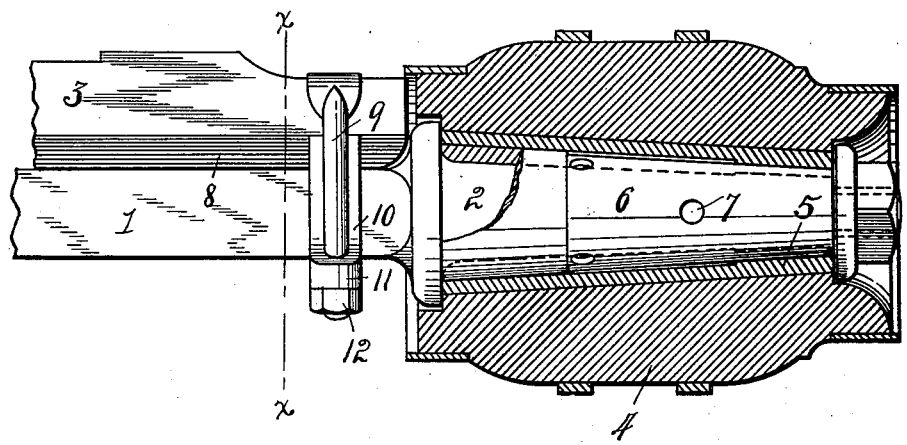
Figure 2:
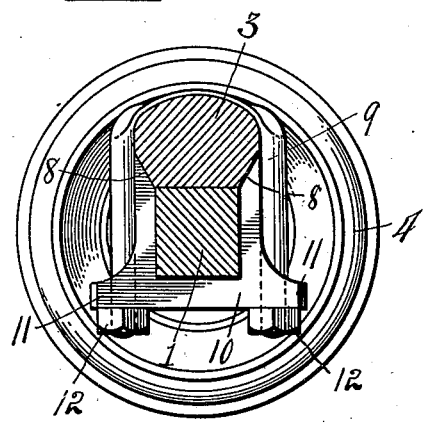

Figure 1 is an elevation of one end portion of an axle and associated wheel hub equipped with our invention, a portion of the spindle sleeve being broken away, and Fig. 2 is a cross-section on the line $x$, $x$ in Fig. 1.

Referring to the drawings, 1 designates a steel axle which is provided at each end with a spindle 2, 3 the capping strip for the axle, and 4 a wheel hub having the customary boxing or lining 5 therein.

One feature of our invention consists in interposing a sleeve 6 loosely between the spindle 2 and hub boxing for free rotation relative to each whereby the sleeve is permitted to turn relative to both the spindle and hub boxing or to either one thereof as the frictional resistance between the sleeve and one of said parts may be greater or less. This sleeve is of suitable size to fit over the spindle 2 for free rotation thereon without rattling, and is also adapted to fit the hub boxing sufficiently close to prevent any rattling or lateral play of one on the other. The sleeve 6 in addition to serving as a friction reducing element between the spindle and hub is also adapted to be placed over steel spindles of steel axles to make them the size of the regular cast thimble skein spindles, whereby the same wheels can be used on either type, thus avoiding the carrying in stock of two different lines of wheels, which is a very important item in the wagon trade.

To facilitate a uniform lubrication of both the inner and outer surfaces of a sleeve 6 it is provided with a plurality of transverse openings 7 therein through which lubrication may be distributed from one side to the other thereof. It is evident that the lubricating of both the inner and outer surfaces of the sleeve provides a large lubricating surface for each wheel, thus eliminating friction by increased lubrication and causing the wagon to run with greater ease. It is also evident that by the use of the rotary sleeve both an inner and outer bearing are provided, either one of which can rotate at one time so that if in the hauling of heavy loads one of the bearings should become dry the other will be in service, thereby making it impossible for a wheel to become fastened to the axle and refusing to turn, or cutting the bearing, which latter is frequently done on the ordinary thimble skein and steel axle type of wagons.

The cap-strip 3 for the axle 1 is of greater width than the axle and has its lower opposite edges beveled, as at 8, to restrict the bottom of the strip to the width of the axle. A plurality of clips 9 and yoke members 10 coöperate to securely retain the cap-strip in centered position on the axle. Each yoke 10 is adapted to straddle the axle from the under side thereof and has its leg terminals of sufficient length to abut against the bevel surface 8 of the cap strip and being in turn beveled in complemental relation to such surface with their outer side surfaces in vertical planes of the respective side edges of the cap strip, as shown. The yoke 10 is provided at its lower or looped end at opposite sides thereof with perforated ears 11 through which the leg terminals of the clip 9 are adapted to project, said clip saddling over the top of the cap strip, as shown. Nuts 12 are threaded onto the leg terminals of the clip below the ears 11 to retain the parts in assembled relation and to permit an opposed tightening of the same against the cap-strip and axle.

It will be noted by this construction that the abutting of the beveled leg ends of the yoke 10 against the complemental surface 8 of the cap strip serves to firmly center the cap strip on the axle, and to prevent relative lateral movements thereof; and also that the legs of the clip 9 extend downward from the sides of the cap-strip and through the yoke ears 11 in parallel relation so that a straight downward pull is exerted upon such legs, which is quite an important feature in devices of this character.

We wish it understood that our invention is not limited to any specific construction or arrangement of the parts except in so far as such limitations are specified in the claims.

Having thus described our invention, what we claim as new, and desire to secure by Letters Patent, is,—

1. The combination with an axle and a cap strip mounted on and being of greater width than the axle, of a yoke member straddling the axle from the under side thereof and having its leg terminals coacting with the respective lower side edges of the cap strip to center it on the axle, and a U-shaped clip straddling the cap strip and having its legs projecting downward in parallel relation and through registering portions of the yoke member, and means coöperating with the yoke member and clip for forcing one toward the other.

2. In combination, an axle, a cap strip mounted on and being of greater width than the axle and having its lower side edges beveled, a yoke member straddling the axle from the under side thereof and having its leg terminals beveled in complemental relation to the respective bevel side edges of the cap strip and terminating in abutment therewith, said yoke having ears projecting laterally from opposite sides thereof and a U-shape clip straddling the cap strip and having its legs projecting downward without the legs of the yoke member and extending through said ears, and means mounted on the clip legs below the ears for drawing the yoke and clip toward each other.

In testimony whereof, we have hereunto signed our names to this specification in the presence of two subscribing witnesses.

ALONZO H. WOOD.
ORLANDO A. FRICK.

Witnesses:
G. H. ROBERTS,
W. W. WOOD.

---

Copies of this patent may be obtained for five cents each, by addressing the "Commissioner of Patents, Washington, D. C."